Figure 1:
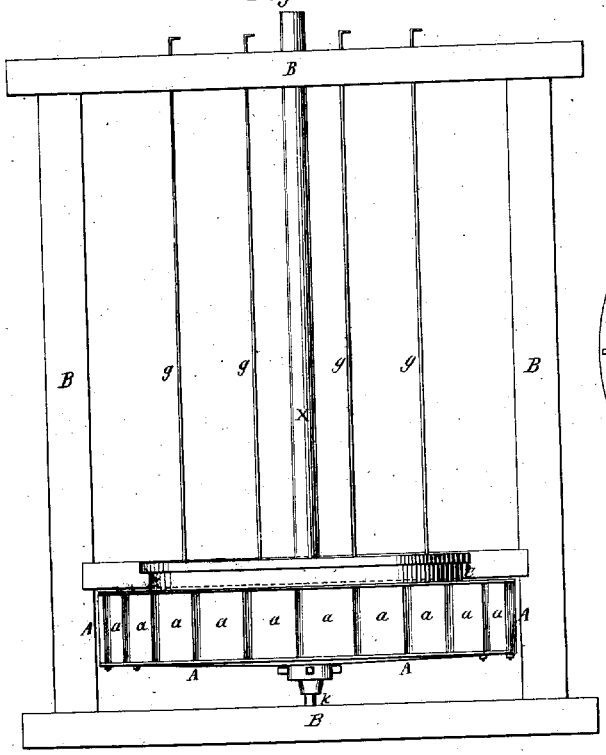
Figure 3:
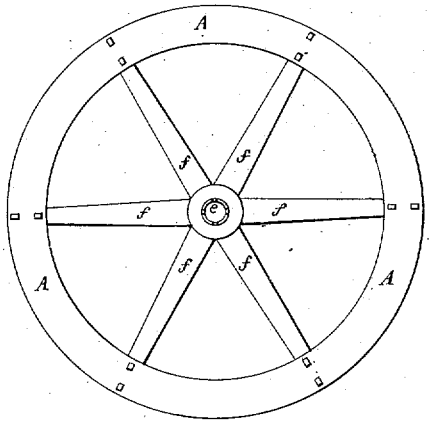
Figure 4:
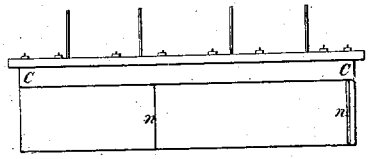
Figure 2:
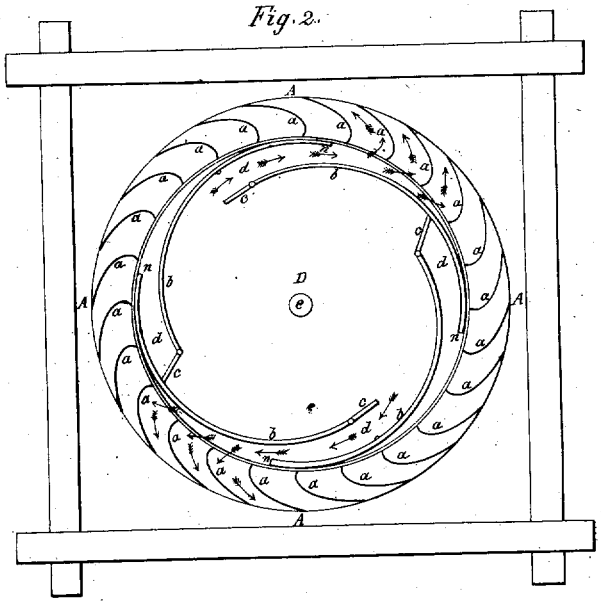
Figure 5:
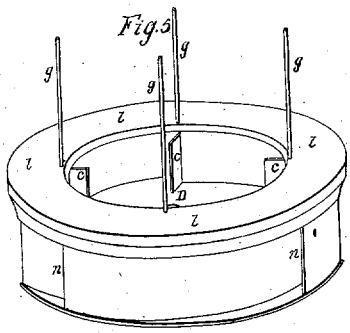

8034X

D. H. Gilbert,

Water Wheel,

Patented Feb. 28, 1834.

N. PETERS, PHOTO-LITHOGRAPHER, WASHINGTON, D. C.

2/28/1834 8034X

David H. Gilbert of Dorchester Massachusetts

Letters Patent

The Schedule referred to in these Letters Patent and making part of the same, containing a description in the words of the said David H. Gilbert himself of his improvement in the mode of driving water wheels by water and in the structures for that purpose.

To all to whom these presents shall come: David H. Gilbert of Dorchester in the County of Norfolk and Commonwealth of Massachusetts mill wright sends Greeting. Be it Known that I the said Gilbert have invented made constructed and applied to use a new and useful improvement in the mode of driving Water wheels by water and in the structures for that purpose, which invention and improvement I describe as follows, that is to say, for the better understanding thereof, I refer to the drawing hereto annexed, which is to be taken and considered as a part of this specification.

Figure numbered one in the said drawing is intended to represent the water wheel and the cistern within it and parts of the frame of the flume connected with it. AAAA designate the part of the figure intended to represent the water wheel which revolves around the cistern upon a vertical axis, which passes up thro the centre of the cistern. a, a, a &c designate the parts intended to represent the buckets of the water wheel. and designate the vertical axis before mentioned whose lower end or gudgeon K. turns in a bearing in the cross piece B. being part of the frame of the flume. B. B. B. B. designate the parts of the figure intended to represent the parts of the frame of the flume which is connected with the cistern. C. C. designate that part of the cistern which is above the water wheel, which revolves around it.

Figure numbered two in the said drawing is intended to represent a horizontal section of the water wheel & of the cistern within it and around which it revolves on its vertical shaft passing up thro the centre of the said cistern at e. AAAA in this figure designate that part of it intended to represent the lower rim of the water wheel which is also represented with its arms in figure numbered three in said drawing. These arms designated by f. f. f. in said figure

[illegible] and these are in the lower rim and are the only arms of the wheel. The
upper arm of the wheel is not shown in the figure numbered two in order that
the buckets may be exhibited which are between the upper and lower rim
fixed in grooves made in the rims. These buckets are in the form of a
curve, as represented in the figure numbered two, which form is deemed best
altho they may be made in the form of an elbow or in somewhat different shape
to answer the purpose tolerably well. In a wheel of ten feet in diameter these
buckets may be about nine inches apart, but they may be farther or nearer from
or to each other as occasion may require according to the size of the wheel, and
the quantity of water to be let upon it.

These buckets are designated by a. a. &c in the said figure numbered two. —
b. b. b. b. designate the parts of the said figure numbered two, intended to represent
the sides of the said cistern around which the water wheel revolves. These sides of
the cistern are so constructed that parts of them from d to n, lap over each
other so as to leave apertures in the form of a curve from the inside of the
cistern at d to the outside of the cistern at n. thro which, when the gates
c. c. c. c. are open the water in the cistern may issue and strike upon & into
the buckets of the wheel. These apertures are to be made larger at the mouth in
side of the cistern where the gates are, than at the outside at n where the
water issues upon the buckets of the wheel, and should gradually decrease in
size from d to n as represented in the figure numbered two. They may be
larger or smaller according to the size of the wheel and the power required. For a
wheel ten feet in diameter with buckets fifteen inches in length and nine inches apart
the apertures may be about eight inches wide at the mouth d. on the inside of the
cistern, and about four inches wide at the mouth n. outside of the cistern.
But these apertures may be larger or smaller according to the size of the wheel
the quantity of water to be let upon it and the power required.

The sides of the cistern are made to lap over each other, and they may be made to
lap over as much as about two feet, so as to make the length of these apertures
about two feet, but they may be made longer or shorter at discretion. For a
wheel of the dimensions above described, there may be from four to six apertures,
but the number may be more or less according to the size of the wheel, the quanti- 8034x

[illegible] to be let upon it [illegible] the power required. The arms of a wheel of the above
dimensions should be about fifteen inches apart, so that the buckets may be about
fifteen inches long and in this case the apertures may be about fifteen inches
high or the same height with the length of the buckets of the wheel. G.G.G.G. desig-
nate the stems of the Gates. These Gates must correspond in number with the aper-
tures if it be requisite to regulate and alter the power and speed of the wheel
from time to time, but otherwise these gates may be dispensed with, and a main
gate to the flume connected with the cistern will answer very well. The course of
the water thro' the apertures is intended to be represented by the arrows on fig-
ure numbered two. — The top of the cistern should be about two inches above
the upper rim of the water wheel [and the bottom of the aperture about the same distance above the lower rim of the water wheel], or the inner edges of the rank of the water wheel
and the sides of the cistern should be so adapted to each other that the wheel
may revolve around the cistern as nearly and closely to it as it can conveniently
be made to do without friction. — D. designates the bottom of the cistern for re-
ceiving and containing the water to be let out thro' the apertures upon the buck-
ets of the water wheel. The cistern somewhat resembles Wing's reaction wheel
as represented in one of the figures in the seventh volume of the journal of the
Franklin Institute at Page eighty seven. Another view of this cistern is
given in figure numbered five in said drawing. The rim which covers
over the top of the said aperture so as to form a sort of curved tube from the
gate at the inner mouth d. to the outer mouth m. is seen in the figure —
being designated by l.l.l.l. The gates are represented as before by c.c.c. & the
stems of the gates by G.G.G.G. by the turning of which the gates are to be opened
or shut, or partly opened or shut at pleasure. These gates however may be
made so as to be opened by hoisting. m. represents the outer mouth of the aper-
tures. — The flume is immediately above the cistern, and is adapted to it, so as
to fit to it water tight, in order to prevent the escape of water.
The flume must be large enough to keep up the head of water required to act
upon the wheel. For a wheel of the above dimensions, a flume about twelve
feet wide and about fifteen feet in length will answer the purpose.
The buckets of the wheel should be of metal, as well as the arms and shaft
and the whole wheel and cistern may also be of metal altho' wood will an-

8034X

[illegible] the purpose. The size of the wheel and of course of the buckets apertures &
[illegible] and of the [illegible] [illegible] [illegible] according to the power required
and quantity and head of water. The wheel constructed in the manner above
described in connexion and combination with the buckets constructed as abo-
described, and driven by water let in [illegible] as above described is capa-
ble of operating advantageously with a small head of water, and will op-
erate with effect when there is much back water, or even when buried
in back water, and requires less expense and is more free from obstruction
by frost or ice than most other wheels.

What I claim as my invention and improvement is the construction
and use of such wheels as above described and such buckets within
them as above described in connexion and combination with each other
for the purpose of driving such wheels by water to carry mills or ma-
chinery of any kind driven by water power.

In testimony that the above is a true specification of my invention &
improvement aforesaid I have hereto set my hand this 21st day of
December in the Year of our Lord Eighteen Hundred and thirty
three

[illegible] Witnesses — David H. Gilbert
[illegible] John H. Parker
B. Rand

Drawing (1680 words

Patented February 28. 1834.